Oct. 24, 1944.     J. ZENDER     2,361,000
PROCESS FOR MAKING DIALYZING MEMBRANES AND ARTICLE SO PRODUCED
Filed Oct. 6, 1941
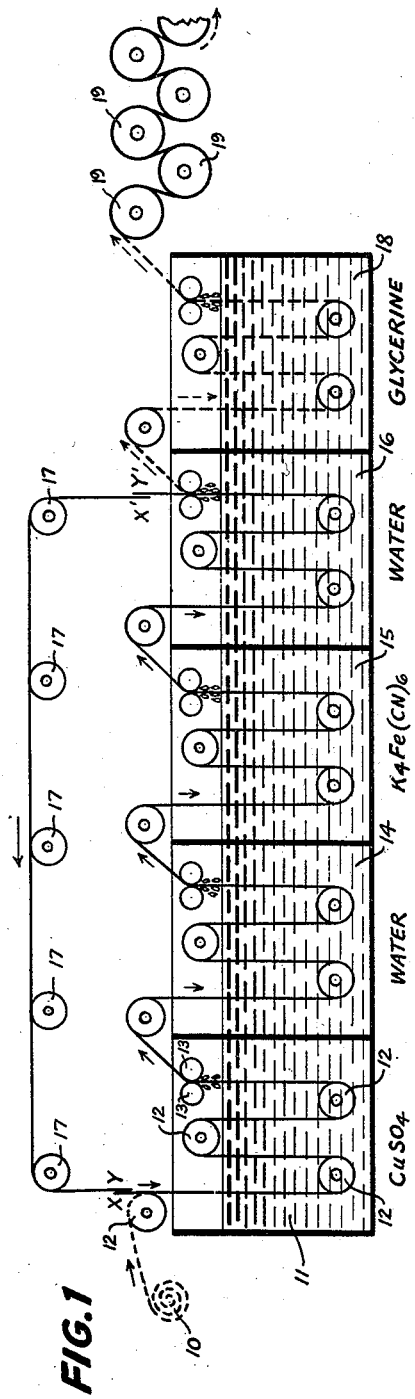
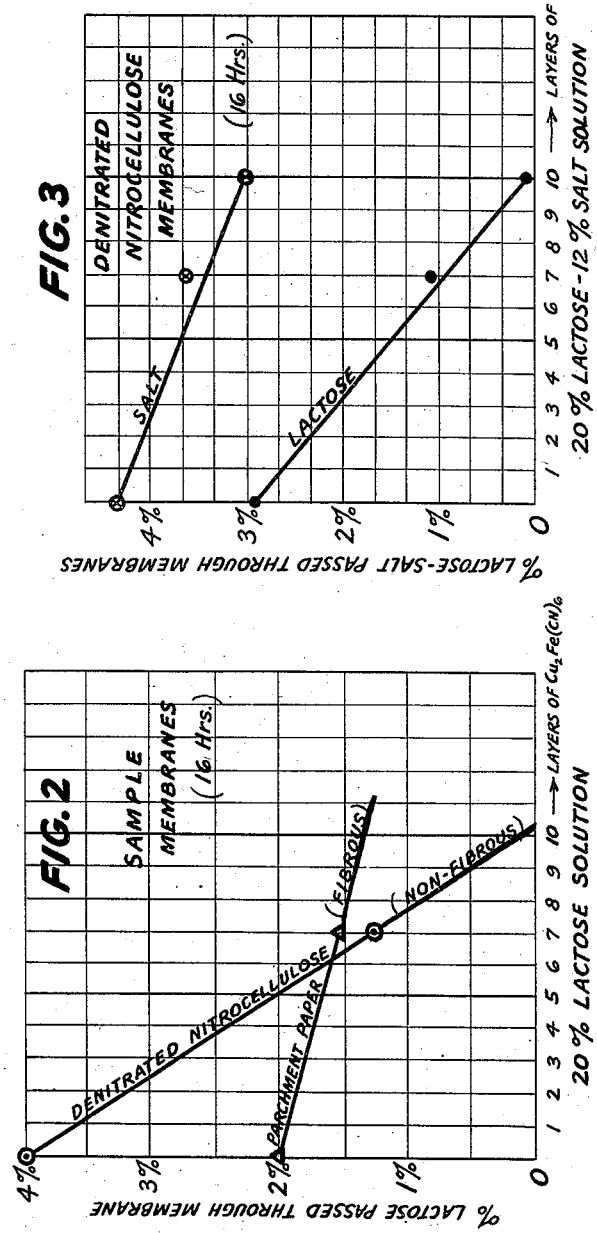
INVENTOR
JUSTIN ZENDER
BY John L. Osmer
ATTORNEY Patented Oct. 24, 1944

2,361,000

UNITED STATES PATENT OFFICE 2,361,000

PROCESS FOR MAKING DIALYZING MEMBRANES AND ARTICLE SO PRODUCED

Justin Zender, Ardsley, N. Y., assignor to Sylvania Industrial Corporation, Fredericksburg, Va., a corporation of Virginia Application October 6, 1941, Serial No. 413,804

6 Claims. (Cl. 117—144)

The present invention relates to a method for making dialyzing membranes and to the membranes thus formed, and includes correlated improvements designed to enhance the utility and structure of such membranes.

It has been found desirable to provide a method of separating substances of different molecular sizes from each other or electrolytes from non-electrolytes, by dialysis. For example, it is frequently necessary to be able to separate crystalloids from crystalloids, crystalloids from colloids, and colloids of different molecular sizes from each other when present in the same solution, colloidal dispersion or suspension. To achieve such selective separation of one substance from another efficiently, it has been found necessary to employ a membrane which will permit one of the dissolved substances to migrate through the membrane, while at the same time substantially retaining the other substance.

Attempts have been made to separate mixtures of dissolved substances by dialysis using unglazed porcelain plates impregnated with a single precipitated deposit of copper ferrocyanide. Such membranes have been found to be inefficient and unsatisfactory because the plates are fragile, the speed of dialysis is low and the separation not sharp enough for commercial use. The efficiency of such impregnated plates is low as a substantial amount of the material desired to be retained passes through the membrane and is lost, for the reason that it is difficult to obtain plates uniformly impregnated.

It is a general object of the present invention to provide a method for forming an improved dialyzing membrane which is rapid and efficient in use.

It is a further object of the invention to provide a method for forming a dialyzing membrane which is flexible, tough, and not fragile.

It is a specific object of the invention to provide a dialyzing membrane comprising a pellicle formed of an hydrophilic organic colloidal material having a high selectivity.

Other objects of the invention will in part be obvious and will in part appear hereinafter.

According to the present invention, there is provided a process for forming a semi-permeable membrane for dialyzing comprising treating a hydrophilic organic pellicle, in sequence, with a plurality of water-soluble inorganic compounds which react with each other to form in situ, within the pellicle, a deposit of a water-insoluble inorganic substance, and thereafter repeating said treatments to form a plurality of such deposits within the same pellicle. In its now preferred embodiment the dialyzing membrane of the invention comprises a hydrophilic organic pellicle impregnated with a plurality of gelatinous deposits of an insoluble inorganic substance formed in situ within the pellicle.

The expression "pellicle of hydrophilic organic colloid" as used in the specification and claims is meant to include fibrous and/or non-fibrous film-forming materials which are capable of absorbing water and swelling in water.

The invention accordingly comprises the several steps and relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention reference should be made to the following detailed description taken in connection with the accompanying drawing, in which:

Fig. 1, diagrammatically illustrates one type of apparatus suitable for carrying out one embodiment of the process of the invention;

Fig. 2 is a graph showing the relative permeability of two different membranes formed according to the invention; and Fig. 3 is a graph showing the effective separation of salt from a sugar-salt solution employing one type of membrane formed in accordance with the invention.

The pellicles employed in forming the semipermeable membrane of the invention may be formed of fibrous and/or non-fibrous hydrophilic organic materials as a class.

The non-fibrous materials, from which pellicles may be formed, comprise film-forming water-swelling (i. e. hydrophilic) colloids as a group such, for example, as cellulose hydrate, alkali-soluble cellulose ethers, hydrophilic cellulose esters, hydrophilic mixed ester-ethers of cellulose, gelatin, casein, de-acetylated chitin, water-swelling resins and the like. The hydrophilic cellulose ethers may comprise the alkyl ethers, the hydroxy-alkyl ethers, the carboxy-alkyl ethers, and the mixed ethers such as alkyl hydroxy-alkyl cellulose ethers, and the cellulose ether xanthates. The cellulose esters which may be used include water-swelling compounds such as low-nitrated cellulose nitrate, low esterified cellulose acetate and cellulose formate, and the like. The cellulose hydrate may be regenerated from viscose or from cuprammonium solutions of cellulose, or from solutions of cellulose in inorganic or organic solvents. Among the water-swelling resins which may be used are the water-swelling polymers of acrylic acid, water-swelling urea-formaldehyde resins, water-swelling methyl-methacrylates, phenol-formaldehyde resins in the "A" stage, and the polyvinyl alcohol resins in the "A" stage, and the like.

The hydrophilic fibrous materials from which the membrane may be formed, comprise organic pellicles formed of parchment paper such as "Patapar," pellicles formed of leather scrap such as the product sold as "Brechteen," and the fibre-bonded felted papers made according to the copending application of Carleton S. Frances, Ser. No. 300,876, filed October 23, 1939.

In the preferred embodiment there is employed a membrane formed of denitrated nitrocellulose. The pellicle employed in the invention as the dialyzing membrane may be in the form of a foil, film, sheet, bag or tubing.

In the preferred practice, the inorganic reactants used to produce the plurality of inorganic deposits within the pellicle are applied to the membrane in dilute solution in a suitable solvent, preferably one having a swelling action on the particular membrane. Suitable solvents for use with and adapted to swell the pellicles of the class herein used for the membrane comprise water, or substances miscible therewith such, for example, as the lower monohydric aliphatic alcohols such, for example, as ethyl alcohol; the polyhydric aliphatic alcohols such, for example, as glycerine and di- or tri-ethylene glycol; triethanolamine and the like, or mixtures of one or more of these solvents with each other or with water.

In order to prepare such sheet material for impregnation, it is often desirable to swell the sheet material and/or treat it with various substances to remove impurities before passing the sheet into the solution of copper sulfate. Thus, a swelling agent such as zinc chloride, sodium hydroxide, calcium thiocyanate and the like may be used for pre-treating the sheet material prior to impregnation in order to facilitate impregnation and/or depositing the insoluble copper ferrocyanide in situ.

It has also been found desirable to treat the sheet material with a detergent, saponifying agent and the like, such as sodium perborate to remove such impurities as oil film, grease, dirt, etc. prior to impregnation. Thereafter the sheet may be rinsed to remove the sodium perborate, or it may be further treated with an acid such as a dilute solution of acetic acid, oxalic acid, etc. to neutralize the residual perborate. The sheet material may then be washed, whereupon it may then be treated with a swelling agent, or impregnated in the manner described to form the membrane.

In its simplest embodiment, the process requires the use of two reactants which shall be referred to hereinafter as "reactants A and B" which react to form a gelatinous insoluble precipitate within the pellicle, and the solutions thereof will be designated respectively as solutions "A" and "B." In general, insofar as the chemical nature of the reactants A and B is concerned, it is not material in which order the solutions thereof are applied to the material.

In the now preferred procedure it has been found desirable, after treating the material with the first solution, to allow sufficient time for the solvent to diffuse through the surface and carry the reactant into the body of the material. On the other hand, it is desirable to remove the surface liquid resulting from treating the material with the first solution so that the reaction occurs only with the absorbed liquid within the pellicle, and thereafter applying the second liquid. The surplus of the first solution may be removed by the use of doctor blades, squeeze rolls or other suitable means and/or by rinsing the treated pellicle with water, and the second solution B is then applied preferably by the use of a bath. As the second solution B diffuses within the pellicle, the reagents A and B react to form the gelatinous insoluble precipitate within the body of the pellicle. The pellicle is again rinsed or washed to remove any surface deposits of the insoluble compound. Thereafter this sequence of steps is repeated until sufficient deposits of the insoluble compound are formed to attain the objects of the invention.

By way of illustrating the steps of the process of the invention, but not by way of limitation, there may be given the following examples of inorganic reactants and insoluble products thereof which are suitable for use in the process:

*Table 1*

| | Reactant A | Reactant B | Precipitate |
|---|---|---|---|
| 1 | Copper sulfate | Potassium ferrocyanide. | Copper ferrocyanide. |
| 2 | Copper tartrate | Sodium ferrocyanide | Do. |
| 3 | Ferric chloride | Potassium ferrocyanide. | Ferric ferrocyanide. |
| 4 | Nickel sulfate | ....do.... | Nickel ferrocyanide. |
| 5 | Calcium chloride | Sodium phosphate | Calcium phosphate. |
| 6 | Zinc chloride | Potassium ferrocyanide. | Zinc ferrocyanide. |
| 7 | Aluminum sulfate | Sodium hydroxide | Aluminum hydroxide. |

According to the preferred process a thin sheet of denitrated nitrocellulose is impregnated with a dilute solution of copper sulfate. The sheet is then gently rinsed with water to remove any surface deposit and passed into a solution of potassium ferrocyanide whereupon an insoluble deposit of copper ferrocyanide is formed in situ within the pellicle. The membrane is then gently rinsed to remove any surface deposit and the process then repeated, passing the sheet from copper bath to ferrocyanide bath, to form a plurality of such layers or deposits of insoluble copper ferrocyanide in situ. From 2 to 15 such complete treatments are performed on the sheet material, forming a like number of consecutive deposits or layers of copper ferrocyanide within the sheet material. The dialyzing membrane thus formed is capable of selectively separating suspended or dissolved particles from other substances in solution, depending upon the nature of the particles and the number of layers of precipitate formed in the pellicle.

For purposes of illustration but not by way of limiting the invention, reference should be had to Fig. 1 of the drawing, wherein denitrated nitrocellulose film 10 is passed over idling rollers 12 in a sinuous manner to thoroughly impregnate the sheet with the copper sulfate solution contained in vessel 11. The film is then passed between squeeze rollers 13 in order to remove excess copper sulfate solution, then through a water bath 14. The traverse of the film through the bath 14 should be regulated to remove copper sulfate from the surface but not substantially from the interior of the pellicle. The sheet is next passed through bath 15 comprising an aqueous solution of potassium ferrocyanide, whereupon copper ferrocyanide is precipitated within the sheet material. The sheet material is then passed through a bath of water 16 to remove excess potassium ferrocyanide and loose deposits of copper ferrocyanide adhering to the surface. The process is then repeated, passing the sheet material over supporting rollers 17, again through the initial copper sulfate solution in bath 11, through water bath 14, then once more into the potassium ferrocyanide bath 15 to precipitate a second layer or deposit of copper ferrocyanide within the sheet material. In order to make the process continuous the sheet material may be joined upon itself at X—Y. Repeating the above process there is formed successively a plurality of deposits of copper ferrocyanide within the sheet material. The process is continuous and may be repeated as often as desired, or until it has been found that a sufficient number of layers or deposits have been formed within the pellicle.

After a sufficient number of deposits have been thus formed, the sheet is broken at X'—Y' and passed through plasticizing bath 18 containing a plasticizer such as 10–20% glycerine or other suitable plasticizer known to the art, then over drying rollers 19 and the sheet material dried and finished in the usual manner.

Referring to Fig. 2 there is shown the result of dialyzing a 20% aqueous solution of lactose through membranes formed of parchment paper and denitrated nitrocellulose, both types of membranes being formed in accordance with the invention. It will be noted that the untreated parchment paper membrane will permit passage of approximately 2% lactose from solution over a period of 16 hours. After the parchment paper has been treated to form seven deposits of copper ferrocyanide in situ, it will be noted that only 1½% lactose passed through the membrane while after fourteen treatments the amount passed falls to about 1%.

Considering the denitrated nitrocellulose membrane, it will be noted that the untreated sheet will permit passage of approximately 4% of lactose within 16 hours, but after the sheet has been impregnated with seven deposits of copper ferrocyanide, approximately only 1¼% of lactose passes from solution, while after ten deposits substantially no lactose passes through the film. In other words, the untreated denitrated nitrocellulose sheet material will initially pass more lactose from solution than parchment paper but after formation of ten deposits of copper ferrocyanide in situ, the denitrated nitrocellulose sheet is substantially impervious to the lactose, in contrast with the treated parchment paper.

In Fig. 3 there is shown the separation of salt from lactose in an aqueous solution comprising 20% lactose and 12% salt. A sheet of denitrated nitrocellulose having 10 deposits of copper ferrocyanide formed in situ within the sheet material was found to pass substantially none of the lactose from solution during 16 hours, while at the same time 3% of the salt content was extracted and removed from the mixture. Thus, within a reasonable time all of the salt could be removed without substantial loss of any of the lactose.

The dialyzing membranes of the present invention have been found useful in the separation of various mixtures of substances in solution, suspension, colloidal dispersion. The semipermeable membranes can be used for the separation of crystalloids from colloids, for example, the separation of salts and sugars from molasses, milk, blood, latex and the like; separation of colloids of large molecular weights from those of smaller molecular weights, such for example as the separation of mixtures of dextrines having different molecular weights, or the separation of impurities from vitamins, hormones, latex, milk, dextrines and the like.

By way of illustrating various methods of forming the dialyzing membrane of the invention but not by way of limitation thereof, the following examples are given:

*Example I*

A denitrated nitrocellulose sausage casing having a wall-thickness of 0.0019 to 0.0026 inch was initially treated with a solution of 2% sodium perborate for about 20 minutes to remove oil film and surface deposit. The casing was then washed to remove the excess sodium perborate. The casing was then treated with an aqueous solution comprising from 5% copper sulfate and sufficient ammonium hydroxide to adjust the pH of the solution to from 7.6 to 7.9. Any undissolved copper hydroxide was then filtered off. The casing was treated with this solution from 5 to 25 minutes, gently rinsed to remove any excess solution from the surface and then passed into a bath comprising from 2 to 10% potassium ferrocyanide having the pH adjusted with acetic acid to from 6.0 to 6.5 and allowed to remain in this solution for about 5 minutes. After such treatment the casing was found to have acquired a light brown coloration due to the formation of insoluble copper ferrocyanide within the casing. The process was then repeated nine times, the casing passing from the copper sulfate bath to the potassium ferrocyanide bath, each time forming an additional layer of insoluble copper ferrocyanide in situ and the casing gradually acquiring a browner coloration with each successive deposit thus formed. A casing having 10 layers of copper ferrocyanide formed in situ contains about 25 grams of copper ferrocyanide per square meter of sheet material. Two superimposed membranes were then tested in a dialyzing vessel and found to retain all but 8% of the saccharose present in molasses which comprised 11–12% salt and 65% of sugars, while removing 89% of the salt present in solution.

*Example II*

A sheet of denitrated nitrocellulose having a wall thickness of 0.0039 inch was treated with a solution comprising approximately 5% Rochelle salt (sodium potassium tartrate) and 5% copper sulphate together with sufficient sodium hydroxide to adjust the pH to approximately 7.5. After treating the sheet with the copper solution for about 15 minutes, the sheet was then gently rinsed with pure water and passed into a solution of potassium ferrocyanide of 10% concentration, containing sufficient quantity of dilute acid to adjust the pH to 6.0–6.5. After 10 minutes a deposit of copper ferrocyanide formed in situ. The sheet material was then washed to remove any surface deposit and the process repeated, passing the film fifteen times through the same baths in the order just described to form a total of 16 successive deposits of copper ferrocyanide in situ. The dialyzing membrane thus formed was found to permit passage of a high percentage of salt from a sugar-salt solution, while retaining substantially all of sugars in solution.

Example III

Parchment paper such as that sold under the trade name "Patapar" was passed into a 3 to 5% ferric chloride solution having the pH adjusted to render the solution slightly acid, i. e., from pH 4-6.9. The sheet was then superficially rinsed to remove surface excess and then passed into a second bath comprising from 2 to 10% potassium ferrocyanide, having the pH adjusted to approximately 7.3 to 8.5, that is, slightly on the alkaline side, whereupon there was formed an insoluble deposit of ferric ferrocyanide in situ. Treatments ranged from 3 to 20 minutes. The sheet was then removed from the potassium ferrocyanide bath, gently rinsed and again treated in the ferric chloride bath and then rinsed again. The above process was then repeated, passing the sheet from ferric chloride bath to potassium ferrocyanide bath, rinsing the sheet between each operation. After twelve such impregnations, the sheet was employed as a dialyzing membrane for selective separation of various substances in solutions of the class described.

Example IV

A sheet of Cellophane was passed through a solution comprising 10% nickel sulfate, 10% Rochelle salt (sodium potassium tartrate) and sufficient sodium hydroxide to adjust the pH to from 7.2 to 9.2. After about twenty minutes the Cellophane was washed to remove surface deposits and passed into a bath comprising from 2 to 10% potassium ferrocyanide having the pH adjusted to 5.2–6.8. The sheet was allowed to stand in this bath for about 10 minutes, again washed to remove surface deposits and the process then repeated, passing the sheet from the nickel sulfate bath to the potassium ferrocyanide bath until the sheet had been impregnated with deposits of nickel ferrocyanide. The sheet was found to be very effective as a dialyzing membrane.

Example V

A sheet of denitrated nitrocellulose having a wall thickness of from 0.0025 to 0.0030 inch was treated with a 2% solution of sodium perborate to cleanse the surface and thereafter rinsed with a dilute solution of oxalic acid to neutralize any remaining perborate. The sheet of denitrated nitrocellulose was then rinsed to remove the sodium perborate or sodium citrate remaining. The sheet was then treated with a 5–10% aqueous solution of zinc chloride having sufficient hydrochloric acid present to adjust the pH to between 4.0 and 6.5. The zinc chloride was allowed to penetrate the sheet material thoroughly for 5 to 15 minutes whereupon the sheet material was sufficiently washed to remove the solution of zinc chloride remaining on the surface, but not to wash out the zinc chloride within the wall structure. The sheet was then passed into an aqueous solution comprising from 5–10% potassium ferrocyanide having the pH adjusted to from 7.5 to 9.8. After about 5 to 10 minutes in contact with the potassium ferrocyanide solution the sheet was removed and found to have become impregnated with a deposit of insoluble zinc ferrocyanide precipitated in situ. The sheet was then washed in water for about a minute to cleanse the surface and the process then repeated, passing the sheet from the zinc chloride solution to the potassium ferrocyanide solution until a plurality of deposits of insoluble zinc ferrocyanide was formed in situ. After about 7 such treatments the sheet material was found to become an effective dialyzing membrane when tested in a dialyzing cell against a molasses solution containing salt. The salt passed through the membrane but the large majority of the sugar was retained in the molasses solution with very little of the sugar passing through the membrane and becoming lost with the salt removed.

It will be noted from the above description and the examples that the pH of the solutions A and B employed in the invention is adjusted to deposit the optimum amount of precipitate in the pellicle in each instance.

The dialyzing membranes may be used in combination with each other, for example, the membranes which may be formed according to the invention may be laminated or placed adjacent one another, or they may be used individually or separately, or in combination with untreated sheets in a dialyzing process.

Among the many advantages which may be mentioned in employing the novel dialyzing membranes herein described, one dissolved substance in a complex solution may be substantially completely separated and removed from said solution with little loss of the other components which are retained in the solution, such for example as a process whereby an electrolyte such as salt dissolved in a complex salt-sugar solution may be separated from the sugars which comprise non-electrolytes, and with minimum loss of sugar from the solution. In employing the membranes in a dialyzing process, the operation proceeds in a uniform and regular manner without necessitating heat and/or pressure, such as would be required in a distillation process. Furthermore, in attempting to separate one or more substances from a complex solution by means of distillation, the quality or chemical nature of such substances is often impaired or destroyed as a result of heating. The dialyzing membrane of the invention has been found to be very effective in efficiently separating various materials dissolved in complex solutions and at the same time such process involves little cost in the way of manufacture, operating expense or labor.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, which I claim as new and desire to secure by Letters Patent is:

1. In a process for forming semi-permeable dialyzing membranes, the steps comprising treating a pellicle of hydrophilic organic colloidal material in sequence, first with a water-soluble inorganic copper salt, thereafter applying a second water-soluble inorganic salt comprising metallic salt of a ferrocyanide, said salts reacting with each other to form a deposit of a water-insoluble inorganic substance within the pellicle, thereafter repeating said treatments to form a plurality of such deposits within the same pellicle.

2. In a process for forming semi-permeable dialyzing membranes, the steps comprising treating a pellicle of non-fibrous hydrophilic cellulosic material in sequence, first with a water-soluble inorganic copper salt, thereafter applying a second water-soluble inorganic salt comprising metallic salt of a ferrocyanide, said salts reacting with each other to form a deposit of a water-insoluble inorganic substance within the pellicle, thereafter repeating said treatments to form a plurality of such deposits within the same pellicle.

3. In a process for forming semi-permeable dialyzing membrane, the steps comprising treating a pellicle of hydrophilic organic colloidal material in sequence first with a water-soluble inorganic compound and thereafter applying a second water-soluble inorganic compound which reacts with said first compound to form a gelatinous deposit of a water-insoluble inorganic substance within the pellicle, thereafter repeating said treatments to form a plurality of such gelatinous deposits within the same pellicle.

4. As an article of manufacture, a semi-permeable dialyzing membrane comprising a pellicle of hydrophilic organic colloidal material having a plurality of gelatinous deposits of a water-insoluble inorganic substance formed within the pellicle.

5. As an article of manufacture, a semi-permeable dialyzing membrane comprising a pellicle of hydrophilic cellulosic material having a plurality of gelatinous deposits of a water-insoluble inorganic substance formed within the pellicle.

6. As an article of manufacture, a semi-permeable dialyzing membrane comprising a pellicle of hydrophilic regenerated cellulose material having a plurality of gelatinous deposits of a water-insoluble inorganic substance formed within the pellicle.

JUSTIN ZENDER.